United States Patent
Stoufer (10) Patent No.: US 10,466,736 B2
(45) Date of Patent: Nov. 5, 2019

(54) SELF-CENTERING SPRING RETURN MECHANISM FOR AN APPLIANCE KNOB

(71) Applicant: ELECTROLUX HOME PRODUCTS, INC., Charlotte, NC (US)

(72) Inventor: Paul Stoufer, Lincolnton, NC (US)

(73) Assignee: Electrolux Home Products, Inc., Charlotte, NC (US)

(*) Notice: Subject to any disclaimer, the term of this patent is extended or adjusted under 35 U.S.C. 154(b) by 339 days.

(21) Appl. No.: 15/413,934

(22) Filed: Jan. 24, 2017

(65) Prior Publication Data

US 2018/0210484 A1     Jul. 26, 2018

(51) Int. Cl.
  *G05G 9/00* (2006.01)
  *G01D 5/14* (2006.01)
  *G05G 1/08* (2006.01)
  *G05G 5/05* (2006.01)
  *G01D 5/24* (2006.01)
  *G05G 1/10* (2006.01)

(52) U.S. Cl.
  CPC ............ *G05G 9/00* (2013.01); *G01D 5/142* (2013.01); *G01D 5/24* (2013.01); *G05G 1/08* (2013.01); *G05G 1/10* (2013.01); *G05G 5/05* (2013.01)

(58) Field of Classification Search
  CPC .. G05G 9/00; G05G 1/08; G05G 1/10; G05G 5/05; G01D 5/142; G01D 5/24; H01H 19/14
  USPC ...... 324/200, 207.19–207.25, 415, 417, 418, 324/168, 180, 134, 419; 200/179, 308, 200/316, 336, 553, 516, 339, 437
  See application file for complete search history.

(56) References Cited

U.S. PATENT DOCUMENTS 3,098,131 A * 7/1963 Gallagher .............. G04C 23/16
                                                  200/38 FA
4,728,755 A * 3/1988 Fowler ................. H01H 19/585
                                                  200/11 DA

* cited by examiner

*Primary Examiner* — Melissa J Koval
*Assistant Examiner* — Trung Nguyen
(74) *Attorney, Agent, or Firm* — Womble Bond Dickinson (US) LLP (57) ABSTRACT

A self-centering knob assembly comprising a back disk, a pair of rotary arms, a spring, and a circuit board fixed to the knob shaft, is provided, with the pair of rotary arms and spring disposed between the back disk and circuit board. Each rotary arm defines first and second slots at opposing ends and a center aperture therebetween that rotatably engages the knob shaft. The first slot engages the end stop pin to limit rotation of the rotary arm. The spring defines opposing arms that engage and oppose rotation of respective rotary arms of the pair. The circuit board includes circuitry configured to provide positioning data of the knob shaft, and including a drive pin that, for each rotary arm, engages and carries the second slot in a respective direction of an opposing direction when the knob shaft and thereby the circuit board is rotated in the respective direction.

18 Claims, 7 Drawing Sheets

SELF-CENTERING SPRING RETURN MECHANISM FOR AN APPLIANCE KNOB

TECHNOLOGICAL FIELD

The present disclosure relates generally to appliances and, in particular, to a self-centering spring return mechanism for a knob assembly of an appliance.

BACKGROUND

Modern appliances may include appropriate components that provide for controlling and/or operating the appliance. In recent years, advancements and continued developments in sensor technology, encoder technology, and/or processing technology have enabled the implementation of sophisticated control units and/or controllers for home appliances. Various operational components of a home appliance may be controlled via a control unit and/or controller in response to various commands or user selections for controlling such components initiated through a control element such as, for example, an appliance knob.

Some home appliances may include a plurality of control knobs and/or the like configured to provide for incremental changes in an appliance operation. For example, an oven may include a knob on a control panel to increase and decrease the temperature of the oven respectively. Additionally or alternatively, an oven may include a knob on a control panel to incrementally adjust a clock, a timer, and/or the like. Another appliance may utilize a knob to cycle through different appliance functions and/or may include a plurality of knobs to indicate each appliance function available for selection. Traditional knobs utilize mechanical components (e.g., detents) to provide user feedback for positioning of the knob.

Therefore, it may be desirable to have an appliance and method that take into account at least some of the issues discussed above, as well as possibly other issues.

BRIEF SUMMARY

Example implementations of the present disclosure are directed to a knob assembly for an appliance or other suitable machine. The knob assembly of example implementations includes a self-centering spring return mechanism to enable improved usability, ergonomics, and user-friendliness when changing an appliance parameter (e.g., oven temperature, cook timer, etc.) and/or an appliance function (e.g., bake, convection bake, broil, etc.). Such a solution should also be capable of implementing a self-centering mechanism that provides controlling operations which are intuitive to the user. The present disclosure includes, without limitation, the following example implementations.

In some example implementations, a knob assembly is provided. The knob assembly comprises a back disk having a knob shaft and an end stop pin, a pair of rotary arms, a spring and a circuit board fixed to the knob shaft with the pair of rotary arms and spring disposed between the back disk and the circuit board. Each rotary arm, of the pair of rotary arms, defines first and second slots at opposing ends and a center aperture therebetween. The center aperture rotatably engages the knob shaft, and the first slot engages the end stop pin to limit rotation of the rotary arm. The spring defines opposing arms, each arm of which engages and opposes rotation of a respective rotary arm of the pair of rotary arms in a respective direction of opposing clockwise and counter-clockwise directions. The circuit board includes circuitry configured to provide positioning data of the knob shaft, and includes a drive pin that, for each rotary arm, engages and carries the second slot in a respective direction of the opposing directions when the knob shaft and thereby the circuit board is rotated in the respective direction.

In some example implementations of the apparatus of the preceding or any subsequent example implementation, or any combination thereof, the spring further defines a center coil from which the opposing arms extend, and the back disk has a spring pin that engages the center coil to retain the spring in position between the back disk and circuit board.

In some example implementations of the apparatus of any preceding or any subsequent example implementation, or any combination thereof, the first slot of each rotary arm engages the end stop pin to limit rotation of the rotary arm to 30 degrees in a respective direction of the opposing clockwise and counter-clockwise directions.

In some example implementations of the apparatus of any preceding or any subsequent example implementation, or any combination thereof, the first slot of one of the pair of rotary arms has an end that engages the stop pin when the knob shaft is rotated 30 degrees in the counter-clockwise direction.

In some example implementations of the apparatus of any preceding or any subsequent example implementation, or any combination thereof, upon release of the knob shaft that is rotated 30 degrees in the counter-clockwise direction, the spring drives the one of the pair of rotary arms in the clockwise direction opposing the respective direction until the first slot of another one of the pair of rotary arms has an end that engages the stop pin, the knob shaft thereby returning to a disengaged position.

In some example implementations of the apparatus of any preceding or any subsequent example implementation, or any combination thereof, rear and front arms of the opposing arms of the spring engage and oppose rotation of respectively rear and front rotary arms of the pair of rotary arms that are proximate respectively the back disk and circuit board.

In some example implementations of the apparatus of any preceding or any subsequent example implementation, or any combination thereof, in an instance in which the knob shaft is rotated in the counter-clockwise direction, the drive pin engages and carries the second slot of the rear rotary arm in the counter-clockwise direction and thereby loads the rear spring, and disengages the second slot of the front rotary arm.

In some example implementations of the apparatus of any preceding or any subsequent example implementation, or any combination thereof, the circuitry configured to provide positioning data of the knob shaft includes at least one of an encoder, or Hall Effect or capacitive circuitry for position resolution.

In some example implementations of the apparatus of any preceding or any subsequent example implementation, or any combination thereof, the circuit board further includes a haptic feedback device coupled to the knob shaft and configured to provide haptic feedback thereat.

In some example implementations, an appliance is provided that comprises a plurality of components configured to perform one or more cleaning, cooking or environmental control operations of the appliance. The appliance also comprises a user interface configured to enable user control of the one or more cleaning, cooking or environmental control operations. The user interface includes knob assembly.

The knob assembly comprises a back disk having a knob shaft and an end stop pin, a pair of rotary arms, a spring and a circuit board fixed to the knob shaft with the pair of rotary arms and spring disposed between the back disk and the circuit board. Each rotary arm, of the pair of rotary arms, defines first and second slots at opposing ends and a center aperture therebetween. The center aperture rotatably engages the knob shaft, and the first slot engages the end stop pin to limit rotation of the rotary arm. The spring defines opposing arms, each arm of which engages and opposes rotation of a respective rotary arm of the pair of rotary arms in a respective direction of opposing clockwise and counter-clockwise directions. The circuit board includes circuitry configured to provide positioning data of the knob shaft, and includes a drive pin that, for each rotary arm, engages and carries the second slot in a respective direction of the opposing directions when the knob shaft and thereby the circuit board is rotated in the respective direction.

In some example implementations of the appliance of the preceding or any subsequent example implementation, or any combination thereof, the spring further defines a center coil from which the opposing arms extend, and the back disk has a spring pin that engages the center coil to retain the spring in position between the back disk and circuit board.

In some example implementations of the appliance of any preceding or any subsequent example implementation, or any combination thereof, the first slot of each rotary arm engages the end stop pin to limit rotation of the rotary arm to 30 degrees in a respective direction of the opposing clockwise and counter-clockwise directions.

In some example implementations of the appliance of any preceding or any subsequent example implementation, or any combination thereof, the first slot of one of the pair of rotary arms has an end that engages the stop pin when the knob shaft is rotated 30 degrees in the counter-clockwise direction.

In some example implementations of the appliance of any preceding or any subsequent example implementation, or any combination thereof, upon release of the knob shaft that is rotated 30 degrees in the counter-clockwise direction, the spring drives the one of the pair of rotary arms in the clockwise direction opposing the respective direction until the first slot of another one of the pair of rotary arms has an end that engages the stop pin, the knob shaft thereby returning to a disengaged position.

In some example implementations of the appliance of any preceding or any subsequent example implementation, or any combination thereof, rear and front arms of the opposing arms of the spring engage and oppose rotation of respectively rear and front rotary arms of the pair of rotary arms that are proximate respectively the back disk and circuit board.

In some example implementations of the appliance of any preceding or any subsequent example implementation, or any combination thereof, in an instance in which the knob shaft is rotated in the counter-clockwise direction, the drive pin engages and carries the second slot of the rear rotary arm in the counter-clockwise direction and thereby loads the rear spring, and disengages the second slot of the front rotary arm.

In some example implementations of the appliance of any preceding or any subsequent example implementation, or any combination thereof, the circuitry configured to provide positioning data of the knob shaft includes at least one of an encoder, or Hall Effect or capacitive circuitry for position resolution.

In some example implementations of the appliance of any preceding or any subsequent example implementation, or any combination thereof, the circuit board further includes a haptic feedback device coupled to the knob shaft and configured to provide haptic feedback thereat.

These and other features, aspects, and advantages of the present disclosure will be apparent from a reading of the following detailed description together with the accompanying drawings, which are briefly described below. The present disclosure includes any combination of two, three, four, or more features or elements set forth in this disclosure, regardless of whether such features or elements are expressly combined or otherwise recited in a specific implementation description herein. This disclosure is intended to be read holistically such that any separable features or elements of the disclosure, in any of its aspects and implementations, should be viewed as combinable, unless the context of the disclosure clearly dictates otherwise.

It will therefore be appreciated that the above Summary is provided merely for purposes of summarizing some example implementations so as to provide a basic understanding of some aspects of the disclosure. As such, it will be appreciated that the above described example implementations are merely examples of some implementations and should not be construed to narrow the scope or spirit of the disclosure in any way. It will be appreciated that the scope of the disclosure encompasses many potential implementations, some of which will be further described below, in addition to those here summarized. Further, other aspects and advantages of implementations disclosed herein will become apparent from the following detailed description taken in conjunction with the accompanying drawings which illustrate, by way of example, the principles of the described implementations.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Like reference numerals refer to like elements throughout. Also, for example, reference may be made herein to quantitative measures, values, relationships or the like. Unless otherwise stated, any one or more if not all of these may be absolute or approximate to account for acceptable variations that may occur, such as those due to engineering tolerances or the like.

Example implementations of the present disclosure are generally directed to a knob assembly for a machine such as an appliance. The knob assembly may be suitable for any of a number of different machines including any of a number of different appliances. Examples of suitable appliances include major appliances (white goods), small appliances and the like. Examples of suitable appliances include dishwashers, washing machines, clothes dryers, refrigerators, freezers, ovens, ranges, cooktops, microwave ovens, trash compactors, air conditioners, vacuum cleaners, water heaters or the like.

Figure 1:
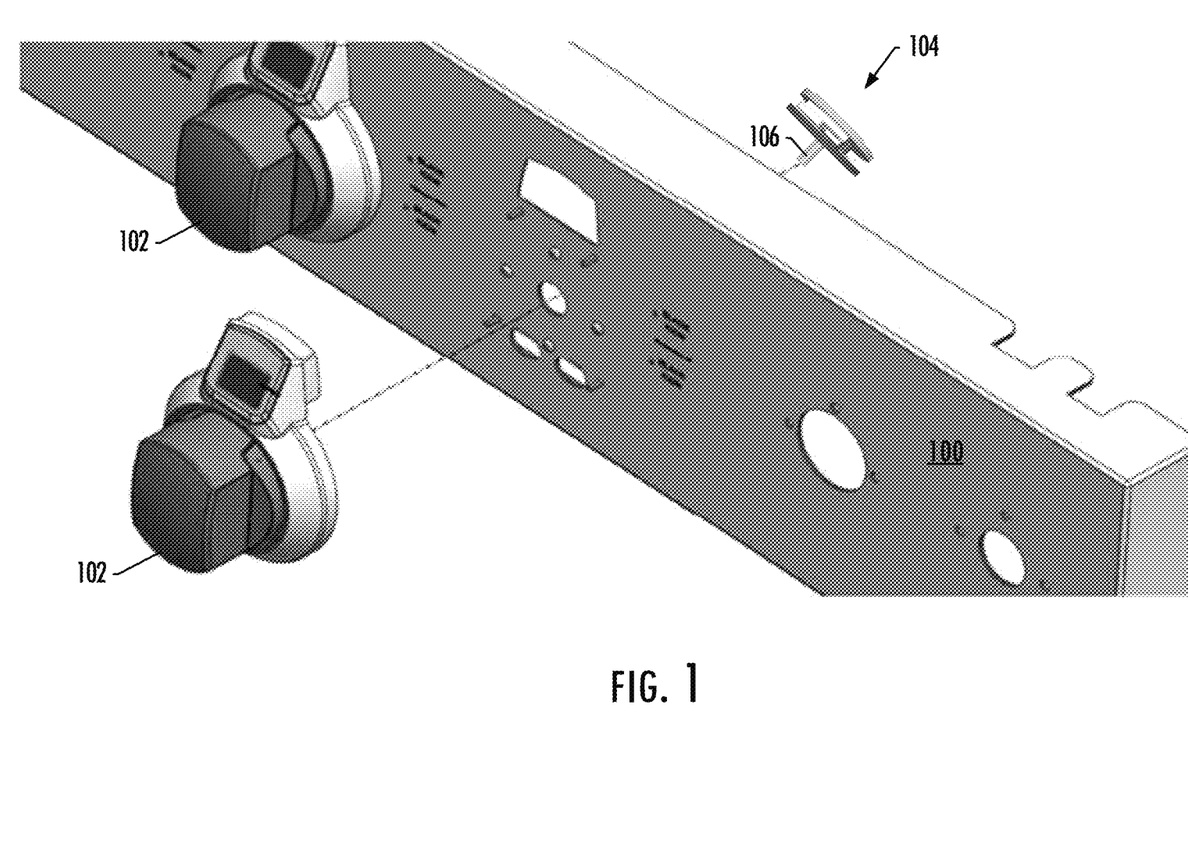
FIG. 1 illustrates an appliance panel having a knob assembly disposed therein, according to one aspect of the present disclosure.
Figure 2A:
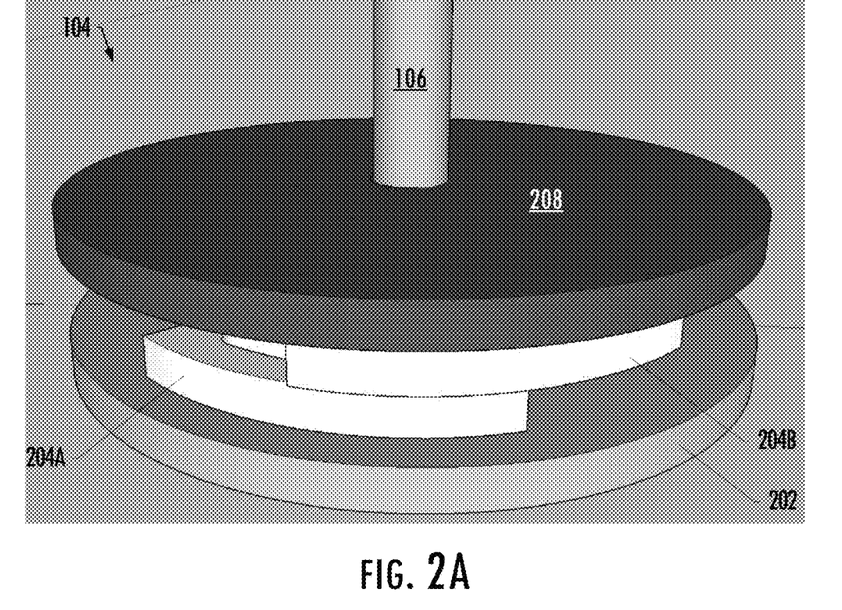
FIGS. 2A and 2B illustrate various aspects of the knob assembly of FIG. 1, according to an example implementation of the present disclosure.
Figure 2B:
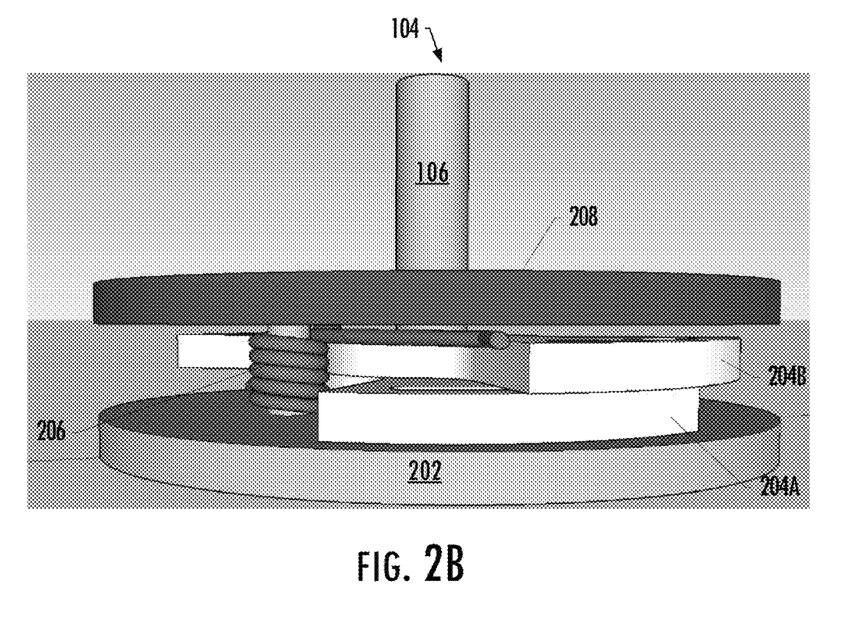

FIG. 1 illustrates an appliance panel 100 comprising one or more knobs 102 and respective knob assemblies 104 disposed therein, with each knob assembly including a knob shaft 106 for engaging the knob assembly with a respective knob. FIGS. 2A and 2B more particularly illustrate the knob assembly of FIG. 1, according to some example implementations. As shown and described in greater detail below, the knob assembly includes a back disk 202, a pair of rotary arms 204 (individually rear and front rotary arms 204A, 204B), a spring 206, and a circuit board 208 configured to implement a self-centering spring return mechanism.

Figure 3:
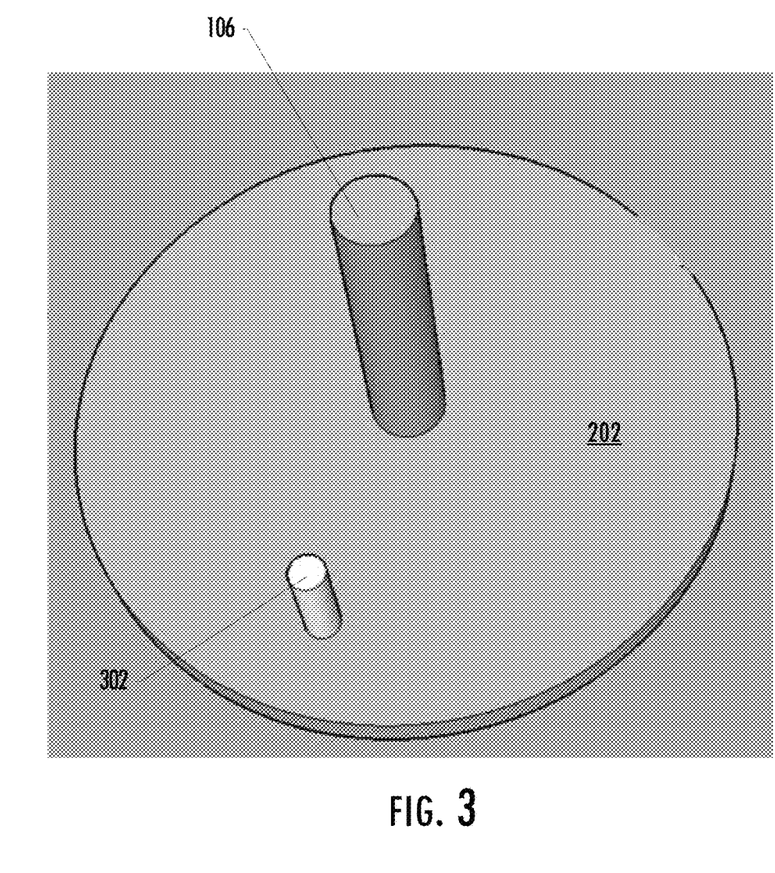
FIGS. 3, 4, 5 and 6 illustrate components of the knob assembly of FIG. 1, according to an example implementation of the present disclosure.
Figure 4:
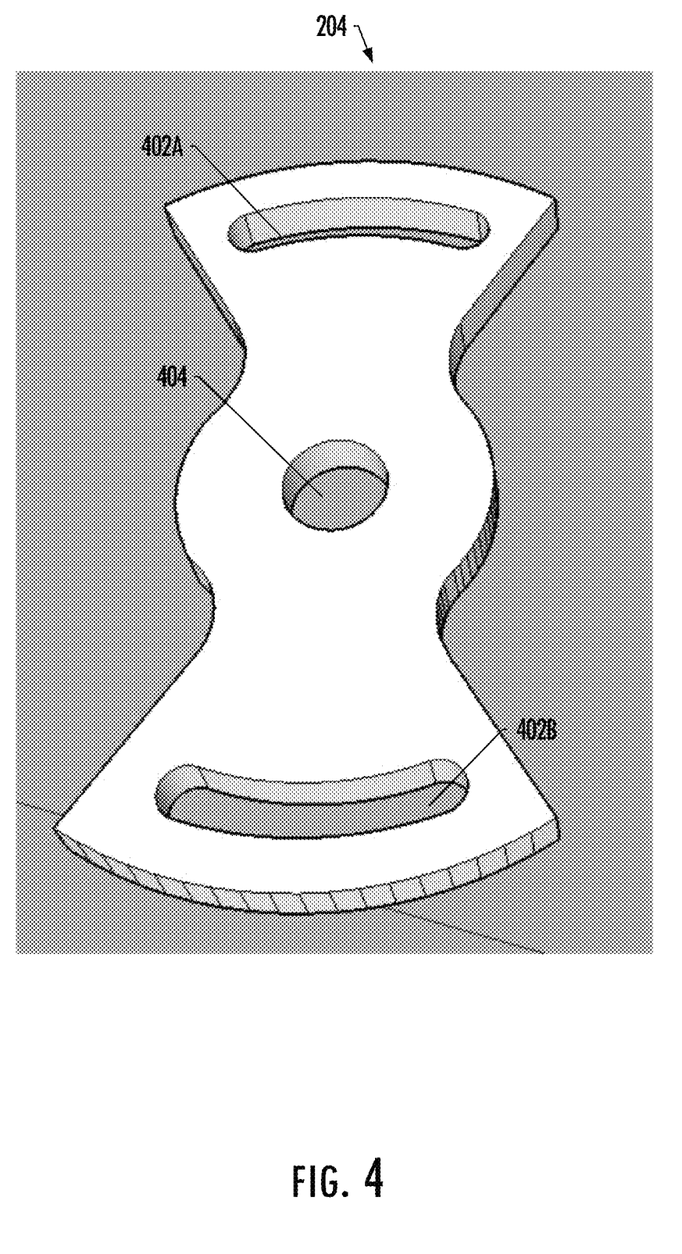

FIGS. 3, 4, 5, and 6 more particularly illustrates respectively the back disk 202, rotary arm 204, spring 206 and circuit board 208 of FIGS. 2A and 2B, according to some example implementations of the present disclosure. As shown in FIGS. 3 and 4, the back disk comprises the knob shaft 106 and an end stop pin 302; and the rotary arm defines first and second slots 402A, 402B at opposing ends, and a center aperture 404 between the first and second slots. The center aperture rotatably engages the knob shaft of the back disk, and the first slot engages the end stop pin of the back disk to limit rotation of the rotary arm. The shape of the rotary arm is defined by a union of a circle and opposing sectors in which the circle is centered on and defines the center aperture, and the opposing sectors defining respective ones of the first and second slots.

Figure 5:
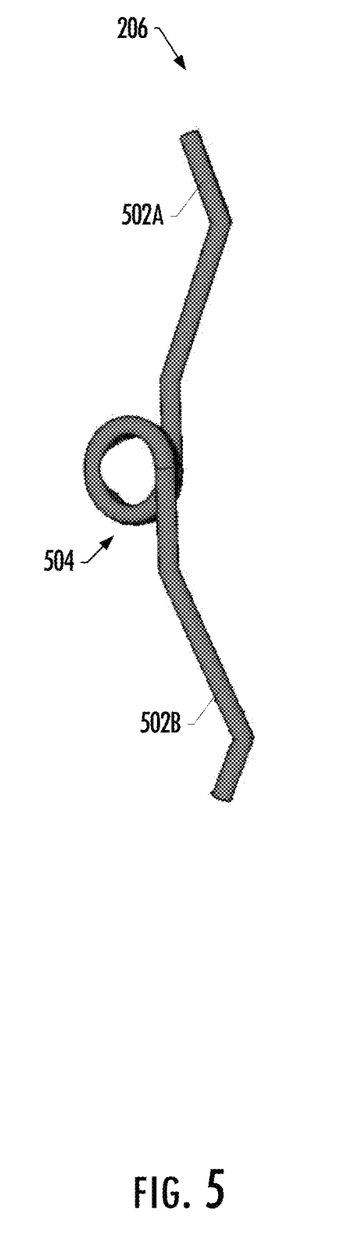
Figure 6:
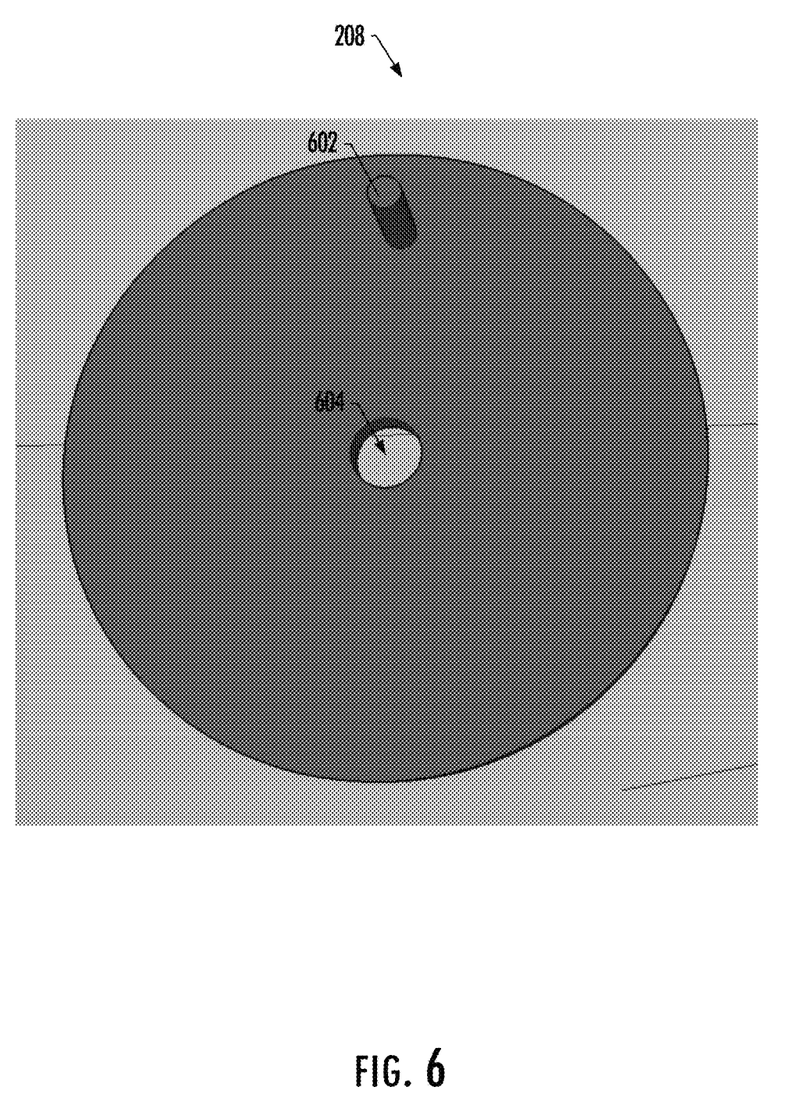

As shown in FIGS. 5 and 5, the spring 206 defines opposing arms 502A, 502B, and a center coil 504 from which the opposing arms extend, and the circuit board 208 includes a drive pin 602 and a center aperture 604 through which the knob shaft 106 extends. The circuit board also includes circuitry configured to provide positioning data of the knob shaft. In some example implementations, the circuit board further includes a haptic feedback device coupled to the knob shaft and configured to provide haptic feedback thereat. In some implementations, the circuitry is configured to provide positioning data of the knob shaft and includes at least one of an encoder, or Hall Effect or capacitive circuitry for position resolution.

Figure 7A:
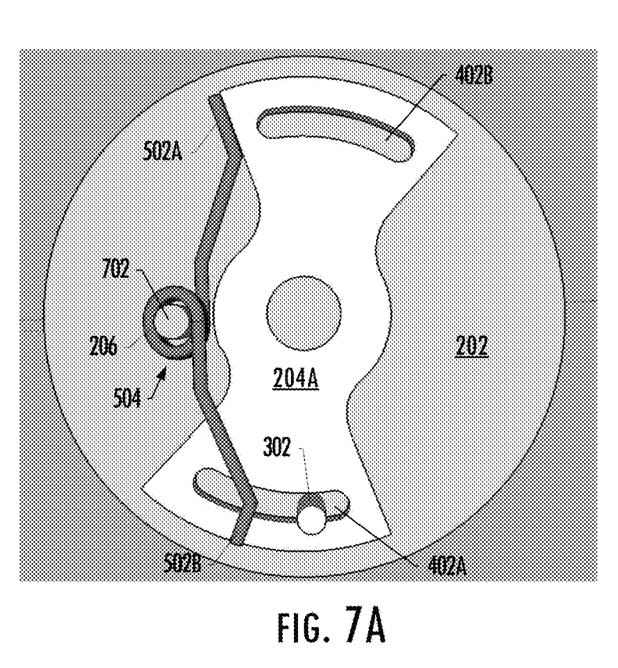
FIGS. 7A and 7B more particularly illustrate a configuration of the components of the knob assembly of FIGS. 3, 4 and 5 according to an example implementation of the present disclosure.
Figure 7B:
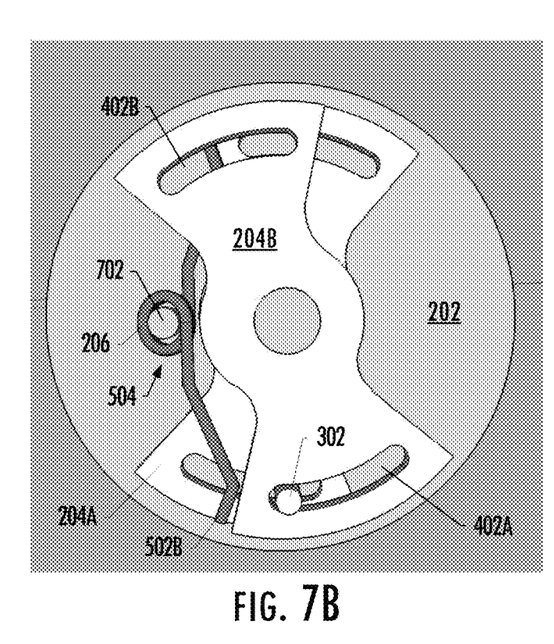

FIGS. 7A and 7B more particularly illustrate the back disk 202 (excluding the knob shaft 106) operatively coupled with the pair of rotary arms 204A, 204B and the spring 206. As shown, each opposing arm 502A, 502B of the spring engages and opposes rotation of a respective rotary arm of the pair of rotary arms in a respective direction of opposing clockwise and counter-clockwise directions. As also shown, the back disk further comprises a spring pin 702 that engages the center coil 504 of the spring to retain the spring in position between the back disk and circuit board 208. In particular, the circuit board is fixed to the knob shaft 106 with the pair of rotary arms and spring disposed between the back disk and circuit board.

In some implementations, the first slot 402A of each rotary arm 204 engages the end stop pin 302 of the back disk 202 to limit rotation of the rotary arm to 30 degrees in a respective direction of the opposing clockwise and counter-clockwise directions. In one example implementation, the first slot of one of the pair of rotary arms has an end that engages the stop pin when the knob shaft 106 of the back disk is rotated 30 degrees in the counter-clockwise direction, and upon release of the knob shaft that is rotated 30 degrees in the counter-clockwise direction, the spring 206 drives the one of the pair of rotary arms in the clockwise direction opposing the respective direction until the first slot of another one of the pair of rotary arms has an end that engages the stop pin. The knob shaft thereby returns to a disengaged position.

In some example implementations, the rear and front arms of the opposing arms 502A, 502B of the spring 206 engage and oppose rotation of respectively rear and front rotary arms 204A, 204B of the pair of rotary arms that are proximate respectively the back disk 202 and circuit board 208. For each rotary arm of the pair of rotary arms, the drive pin 602 of the circuit board engages and carries the second slot 402B in a respective direction of the opposing directions when the knob shaft and thereby the circuit board is rotated in the respective direction. In these implementations, in an instance in which the knob shaft 202 is rotated in the counter-clockwise direction, the drive pin engages and carries the second slot 402B of the rear rotary arm in the counter-clockwise direction and thereby loads the rear spring, and disengages the second slot of the front rotary arm.

Many modifications and other implementations of the disclosure set forth herein will come to mind to one skilled in the art to which these disclosure pertain having the benefit of the teachings presented in the foregoing descriptions and the associated drawings. Therefore, it is to be understood that the disclosure are not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A knob assembly comprising:
   a back disk having a knob shaft and an end stop pin;
   a pair of rotary arms, each rotary arm of which defines first and second slots at opposing ends and a center aperture therebetween, the center aperture rotatably engaging the knob shaft, and the first slot engaging the end stop pin to limit rotation of the rotary arm, wherein the end stop pin extends through the first slot;

a spring defining opposing arms, each arm of which engages and opposes rotation of a respective rotary arm of the pair of rotary arms in a respective direction of opposing clockwise and counter-clockwise directions; and a circuit board fixed to the knob shaft with the pair of rotary arms and spring disposed between the back disk and circuit board, the circuit board including circuitry configured to provide positioning data of the knob shaft, and including a drive pin that, for each rotary arm, engages and carries the second slot in a respective direction of the opposing directions when the knob shaft and thereby the circuit board is rotated in the respective direction.

2. The knob assembly of claim 1, wherein the spring further defines a center coil from which the opposing arms extend, and the back disk has a spring pin that engages the center coil to retain the spring in position between the back disk and circuit board.

3. The knob assembly of claim 1, wherein the first slot of each rotary arm engages the end stop pin to limit rotation of the rotary arm to 30 degrees in a respective direction of the opposing clockwise and counter-clockwise directions.

4. The knob assembly of claim 3, wherein the first slot of one of the pair of rotary arms has an end that engages the stop pin when the knob shaft is rotated 30 degrees in the counter-clockwise direction.

5. The knob assembly of claim 4, wherein upon release of the knob shaft that is rotated 30 degrees in the counter-clockwise direction, the spring drives the one of the pair of rotary arms in the clockwise direction opposing the respective direction until the first slot of another one of the pair of rotary arms has an end that engages the stop pin, the knob shaft thereby returning to a disengaged position.

6. The knob assembly of claim 1, wherein rear and front arms of the opposing arms of the spring engage and oppose rotation of respectively rear and front rotary arms of the pair of rotary arms that are proximate respectively the back disk and circuit board.

7. The knob assembly of claim 6, wherein in an instance in which the knob shaft is rotated in the counter-clockwise direction, the drive pin engages and carries the second slot of the rear rotary arm in the counter-clockwise direction and thereby loads the rear spring, and disengages the second slot of the front rotary arm.

8. The knob assembly of claim 1, wherein the circuitry configured to provide positioning data of the knob shaft includes at least one of an encoder, or Hall Effect or capacitive circuitry for position resolution.

9. The knob assembly of claim 1, wherein the circuit board further includes a haptic feedback device coupled to the knob shaft and configured to provide haptic feedback thereat.

10. An appliance comprising:
a plurality of components configured to perform one or more cleaning, cooking or environmental control operations of the appliance; and
a user interface configured to enable user control of the one or more cleaning, cooking or environmental control operations, the user interface including a knob assembly comprising:

a back disk having a knob shaft and an end stop pin;
a pair of rotary arms, each rotary arm of which defines first and second slots at opposing ends and a center aperture therebetween, the center aperture rotatably engaging the knob shaft, and the first slot engaging the end stop pin to limit rotation of the rotary arm, wherein the end stop pin extends through the first slot;
a spring defining opposing arms, each arm of which engages and opposes rotation of a respective rotary arm of the pair of rotary arms in a respective direction of opposing clockwise and counter-clockwise directions; and
a circuit board fixed to the knob shaft with the pair of rotary arms and spring disposed between the back disk and circuit board, the circuit board including circuitry configured to provide positioning data of the knob shaft, and including a drive pin that, for each rotary arm, engages and carries the second slot in a respective direction of the opposing directions when the knob shaft and thereby the circuit board is rotated in the respective direction.

11. The appliance of claim 10, wherein the spring further defines a center coil from which the opposing arms extend, and the back disk has a spring pin that engages the center coil to retain the spring in position between the back disk and circuit board.

12. The appliance of claim 10, wherein the first slot of each rotary arm engages the end stop pin to limit rotation of the rotary arm to 30 degrees in a respective direction of the opposing clockwise and counter-clockwise directions.

13. The appliance of claim 12, wherein the first slot of one of the pair of rotary arms has an end that engages the stop pin when the knob shaft is rotated 30 degrees in the counter-clockwise direction.

14. The appliance of claim 13, wherein upon release of the knob shaft that is rotated 30 degrees in the counter-clockwise direction, the spring drives the one of the pair of rotary arms in the clockwise direction opposing the respective direction until the first slot of another one of the pair of rotary arms has an end that engages the stop pin, the knob shaft thereby returning to a disengaged position.

15. The appliance of claim 10, wherein rear and front arms of the opposing arms of the spring engage and oppose rotation of respectively rear and front rotary arms of the pair of rotary arms that are proximate respectively the back disk and circuit board.

16. The appliance of claim 15, wherein in an instance in which the knob shaft is rotated in the counter-clockwise direction, the drive pin engages and carries the second slot of the rear rotary arm in the counter-clockwise direction and thereby loads the rear spring, and disengages the second slot of the front rotary arm.

17. The appliance of claim 10, wherein the circuitry configured to provide positioning data of the knob shaft includes at least one of an encoder, or Hall Effect or capacitive circuitry for position resolution.

18. The appliance of claim 10, wherein the circuit board further includes a haptic feedback device coupled to the knob shaft and configured to provide haptic feedback thereat.

* * * * *